United States Patent [19]

Schmid

[11] Patent Number: 5,289,092
[45] Date of Patent: Feb. 22, 1994

[54] APPARATUS AND METHOD FOR D.C. MOTOR CONTROL

[75] Inventor: Gerold E. Schmid, Brookfield, Wis.

[73] Assignee: Harnischfeger Corporation, Brookfield, Wis.

[21] Appl. No.: 740,269

[22] Filed: Aug. 5, 1991

[51] Int. Cl.$^5$ .............................. H02P 7/00
[52] U.S. Cl. ..................... 318/432; 388/930; 414/725
[58] Field of Search .............. 318/255–257, 318/432, 590–592; 388/806, 815, 823, 833, 838, 930; 414/685, 722–723, 724–726; 37/135–137, DIG. 1

[56] References Cited

U.S. PATENT DOCUMENTS

| | | | |
|---|---|---|---|
| 3,553,554 | 1/1971 | Risberg | 318/257 |
| 3,675,097 | 7/1972 | Mulligan | 318/257 X |
| 4,027,215 | 5/1977 | Knight et al. | 318/432 X |
| 4,079,301 | 3/1978 | Johnson | 318/432 X |
| 4,498,035 | 2/1985 | Bobeck | 318/257 |
| 4,571,668 | 2/1986 | Azusawa et al. | 388/815 X |

Primary Examiner—William M. Shoop, Jr.
Assistant Examiner—David Martin
Attorney, Agent, or Firm—Richard C. Ruppin

[57] ABSTRACT

A control for a d.c. motor having a d.c. thyristor power supply connected to a d.c. motor and a control circuit for selectively varying and controlling the level of the current provided by the thyristor power supply to the motor. The thyristor power supply provides a plurality of selected output current levels to the motor and the motor has a corresponding plurality of torque levels. The level of the output current supplied by the power supply to the motor is independent of the resistance in the motor circuit. The motor is rotatable in opposite directions and the thyristor power supply will provide output voltage at opposite pluralities corresponding to the rotational direction of the motor.

5 Claims, 3 Drawing Sheets

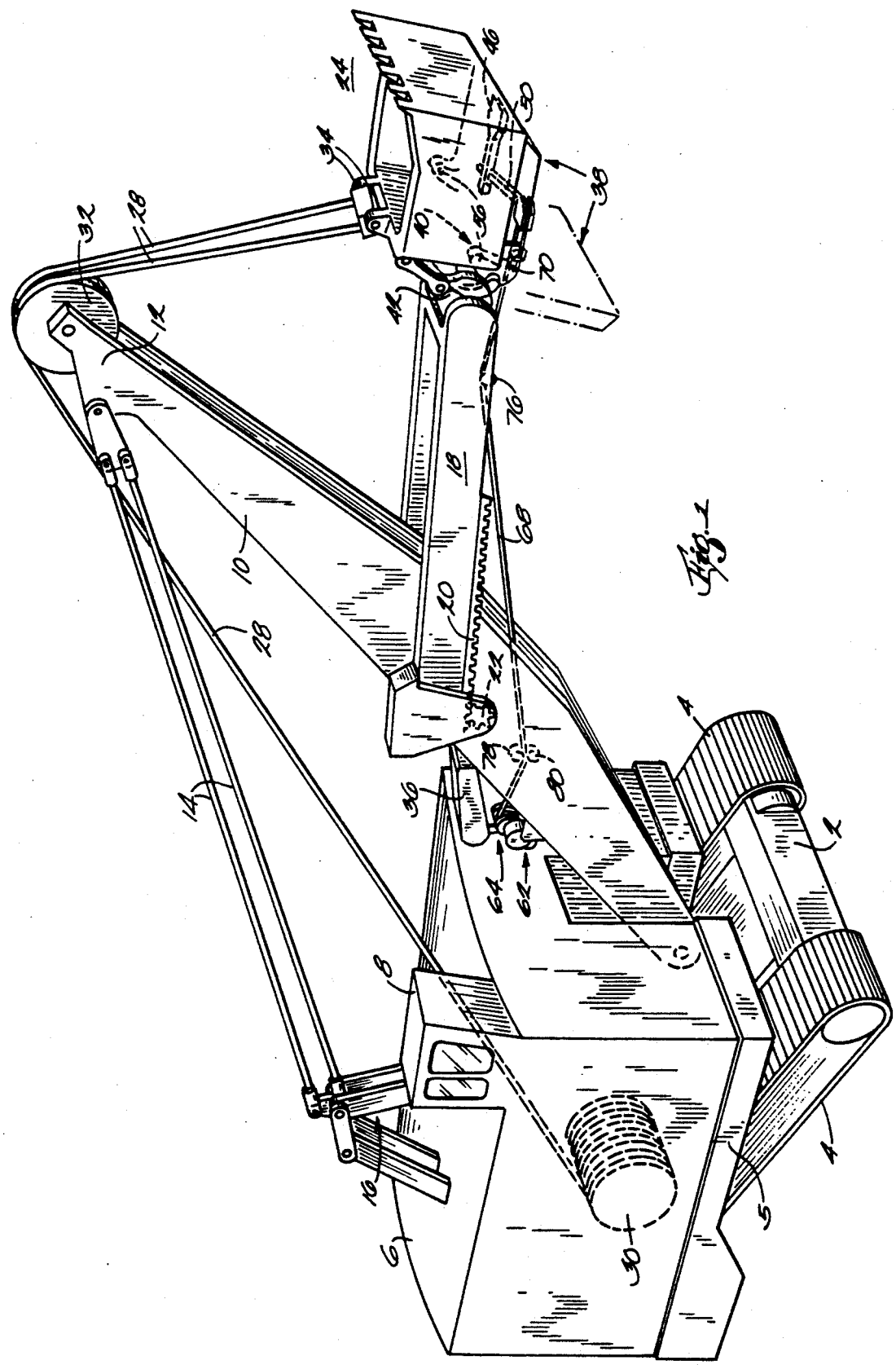

APPARATUS AND METHOD FOR D.C. MOTOR CONTROL

FIELD OF THE INVENTION

This invention relates to control of the torque produced by a d.c. motor and, in particular, the invention relates to selectively producing current to a d.c. motor to control the torque of the motor.

BACKGROUND OF THE INVENTION

A common approach to control the torque of an electric motor is to connect resistors in the motor circuit and selectively switch the resistors effectively into or out of the circuit. In the case of a.c. motors, a wound rotor induction motor may be used with multiple steps of resistors and contactors connected via slip rings to the rotor field circuit. The contactors are selectively opened or closed to include or exclude the resistors from the circuit and thereby control the amount of rotor current and consequently the amount of torque produced by the motor. In the case of d.c. motors, a series wound d.c. motor may be used and supplied with constant potential d.c. power. Multiple steps of resistors and contactors are placed in the supply portion of the motor circuit and the contactors are opened and closed to effectively include or exclude the resistors from the circuit to thereby control the amount of current flowing to the motor and consequently control the torque produced by the motor.

The above-described types of torque control circuits are presently used in large mining shovels for actuating the tripping mechanism of the door of the dipper of the shovels. In these applications, a low current level is supplied utilizing the circuits described above to maintain a low motor torque output adequate to maintain a tight trip line but less than required to trip the dipper door open. When it is desired to actuate the dipper door trip mechanism, resistors in the motor circuit are effectively switched out of the circuit to increase the current level to the motor so that the torque produced by the motor consequently increases to cause actuation of the dipper door trip mechanism.

In motor circuits requiring resistors and contactors to control the torque of the motor, there is considerable power loss in the resistors and consequent heat build-up. In general, the control arrangement is very inefficient. The resistors and contactors require cabinet space and the contactors have frequent duty cycles and thereby have a relatively high wear rate. Also, the current level adjustment is relatively limited by the number of resistors and switching arrangements which are available.

SUMMARY OF THE INVENTION

It is a general object of this invention to provide an improved motor control for selectively controlling the torque produced by a d.c. motor. It is also an object of the invention to control the torque of a d.c. motor by selectively varying the current produced to the motor by the d.c. power supply to which the motor is connected. It is a further object of the invention to control the torque of a d.c. motor by selectively varying the current supplied to the motor independently of the resistance in circuit with the motor. It is another object of the invention to provide a trip apparatus for the door of the dipper of a mining shovel in which the torque of a d.c. motor for operating the trip apparatus has its torque controlled by selectively controlling the current produced to the motor from a d.c. power supply.

The invention is carried out by connecting a d.c. power supply which may be of a variable voltage thyristor type to a d.c. electric motor and selectively varying the level of the current produced by the power supply to the motor to result in the production by the motor of the desired torque level. The level of the current supplied to the motor is independent of the resistance in the motor circuit. The level of the supplied current also may be independent of the load on the d.c. motor.

The d.c. motor has a plurality of torque producing conditions and the d.c. Power supply connected to the motor comprises a selectively variable level current source having a plurality of current levels corresponding to the plurality of torque producing conditions of the motor. Where the motor control is utilized to trip a mining shovel dipper door, the dipper door trip means is connected to the d.c. motor and causes trip open actuation of the dipper door in response to the change in the current level of the power supply from a first to a second level and a consequent corresponding change in the motor from a first torque producing condition to a second torque producing condition.

BRIEF DESCRIPTION OF THE DRAWINGS

Further objects and advantages of the invention will appear when taken in conjunction with the accompanying drawings, in which:

FIG. 1 is a perspective view of a surface mining shovel embodying the invention;

DETAILED DESCRIPTION OF THE INVENTION

Figure 2B:
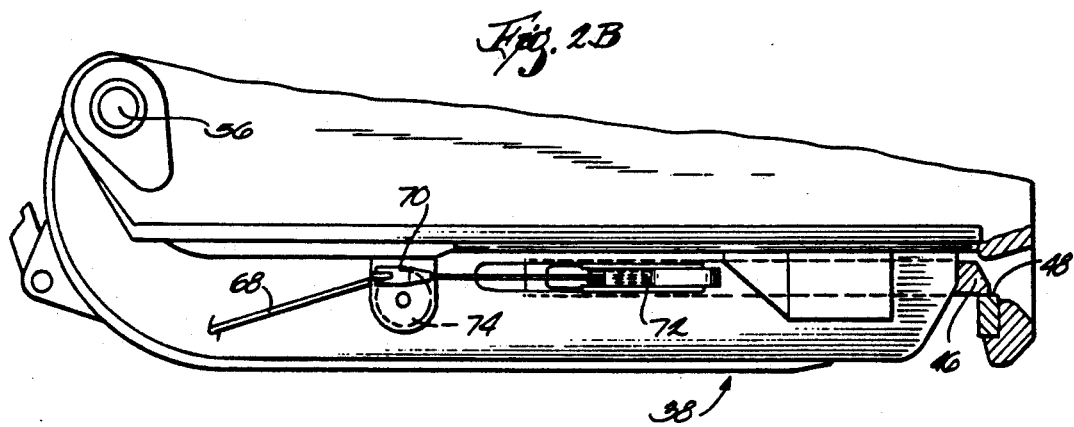
FIG. 2B is a side elevation view of the dipper door shown in FIG. 2A.

The invention is described in conjunction with the surface mining shovel illustrated in FIG. 1. With reference to FIG. 1, the mining shovel includes a car body 2 on which are mounted crawler tracks 4 and which supports a revolving frame 5 and machinery house 6. An operator's cab 8 extends upward from the machinery house 6 and includes controls for directing the operation of the shovel. A boom 10 extends upwards at an angle from frame 5 and is pivotally supported on the frame 5 and further supported at boom point 12 by suspension cables 14. The suspension cables 14 extend between the boom point 12 and a gantry 16 which is affixed to and projects upward from the frame 5. A handle 18 is movably mounted on the boom 10 and extends from and swings about the boom on the rack 20 and pinion 22. The handle 18 may be driven in the direction of its length by rotation of the pinion 22 by a drive 36 controlled from the operator's cab 8. A dipper 24 is pivotally mounted on the outward end 26 of the handle 18. Hoist ropes 28 extend from a hoist drum 30 located in the machinery house 6 over sheaves 32 rotatably mounted on the boom point 12 of the boom and then downward to connect to the dipper 24 at ears 34 located on the dipper. The hoist drum 30 is controlled from the operator's cab 8 and is rotated either to pay-out ropes 28 to pivot the handle 10 and swing the dipper 24 about the boom 10 in a lowering direction or to take in ropes 28 to swing the dipper in a raising direction. The dipper 24 includes a bottom door 38 pivotally mounted on each side of the dipper by pins 56 and dampened during pivoting movement by snubber linkage 42.

Figure 2A:
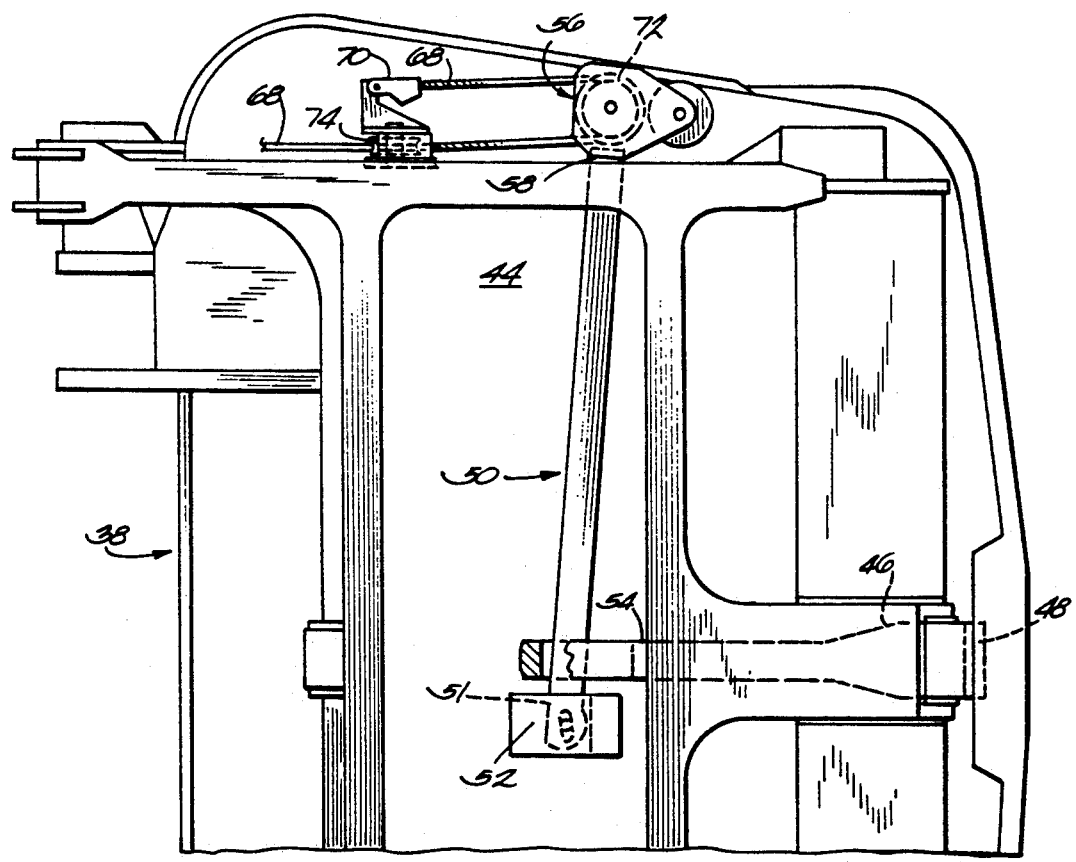
FIG. 2A is a bottom plan view of a part of a shovel dipper door illustrating a portion of a door trip mechanism.

The mining shovel also includes with reference to FIGS. 1, 2A, 2B and 3A, a dipper door trip system 40 comprising a door latching mechanism 44 on the dipper door 38, a trip control circuit 60 including a d.c. motor 62 and a thyristor power supply 88, a cable take-up reel 64 attached to a shaft 66 which is connected to the motor 62, and a trip cable 68. The latching mechanism 44 includes a latch rod 46 which is slidably mounted on the door 38 for movement into and out of engagement with a latch lip 48 mounted on a wall of the dipper. A latch release arm 50 has a first end 51 extending into a retaining bracket 52 on the door 38 so that the end 51 is held in the bracket in a pivotal and slidable fashion. The arm 50 extends through a slot 54 in the latch rod 46 and has a second 58 end including a trip actuating mechanism 56. The latch rod 46 is held by the force of its own weight toward engagement with the lip 48 to hold the door in the closed position as shown in FIG. 2A, 2B and in full lines in FIG. 1. However, when the trip actuating mechanism 56 is moved in a direction parallel to the length of the latch rod 46 and away from the lip 48, the arm 50 moves the latch arm 46 out of engagement with the lip permitting the door 38 to drop open, as shown in phantom lines in FIG. 1, due to its own weight. The door is again closed when the dipper is tilted such that the suspended position of the door causes it to engage the dipper and the latch arm 46 again moves into engagement with the lip 48 due to the weight of the arm 46.

The trip cable 68 is attached to a dead end 70 on the dipper door 38 and is reeved over a sheave 72 on the latch release mechanism 56 and sheaves 74 on the door 38, sheave 76 on the handle 18, and between sheaves 78 and 80 on the boom 10. The opposite end of the cable 68 is connected to the take-up reel 64. As the dipper 24 is swung upward or downward by the paying out or taking in of the hoist ropes 28 or moved away from or toward the boom by movement of the handle in the direction of its length, the motor 62 rotates to rotate the reel 64 and take cable 68 in when the dipper moves toward the reel and the reel and motor are rotated to pay cable out by the pulling force of the dipper as it moves away from the reel. As will be described in greater detail hereinafter, the level of the torque output of the motor 62 is determined by the level of the d.c. current supplied to it. During operation of the shovel with the dipper door 38 closed, the torque of the motor is maintained at a low level so that insufficient tensioning force is applied to the cable 68 as it is taken in or paid out, or is stationary, to move the trip actuating mechanism 56 against the biasing force of the weight of the arm 46 to trip open the door 38. However, if the motor torque is increased to a level such that the cable 68 is sufficiently tensioned to move the actuating mechanism against the force of the weight of the arm 46, the door 38 will be tripped open as previously described.

Figure 3A:
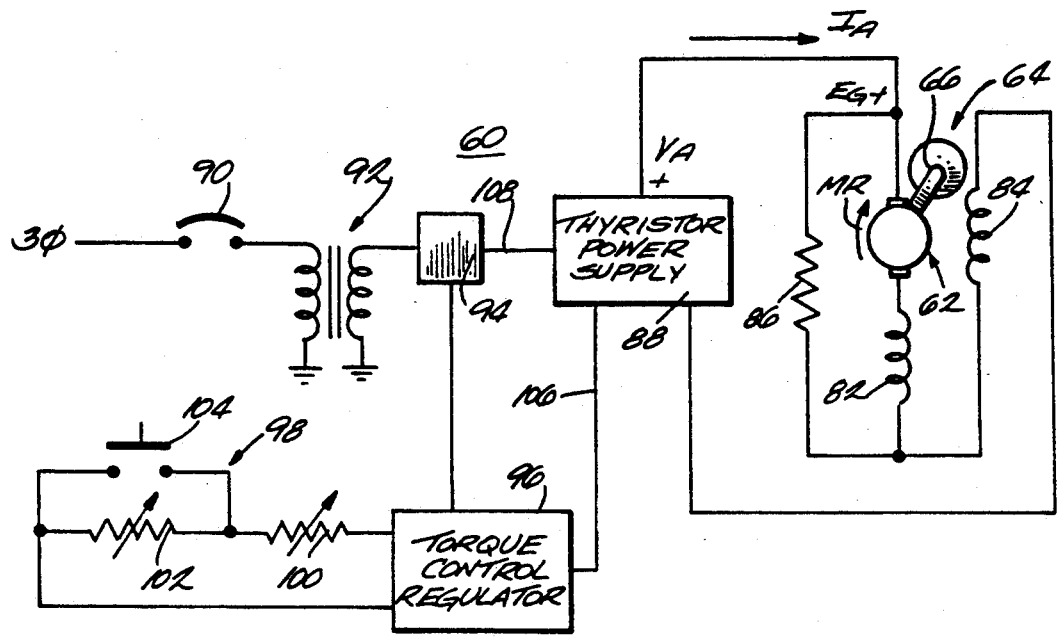
FIG. 3A is a schematic circuit diagram illustrating the invention.

With reference to FIG. 3A, a trip control circuit 60 is illustrated which includes the d.c. motor 62 having an armature winding 82 and a field winding 84 connected in series, a speed limiting resistor 86 shunting the armature winding, and a thyristor power supply 88 connected to the motor 62. The thyristor power supply is connected to three phase alternating current power 3Φ through circuit breaker 90 and transformer 92. A current sensing device 94 senses the level of the alternating Current supplied to the thyristor power supply and provides a signal to the torque control regulator 96 representative of the level of the actual current to the thyristor power supply and therefore also representative of the level of the actual d.c. current $I_A$ to the motor 62. A torque control selection circuit 98 is connected to the torque control regulator 96 and permits selection of one of two current outputs from the power supply 88 to the motor 62 and thereby selection of one of two corresponding torque levels produced by the motor 62. The torque selection circuit 98 includes adjustable potentiometer resistors 100 and 102 and a normally open switch 104 shunting resistor 102. The torque control regulator 96 produces an output signal on line 106 to the thyristor power supply 88 for controlling the operation of the power supply to produce d.c. current to the motor 62 at a level selected by the torque selection circuit 98.

During operation of the shovel with the dipper door closed, as previously described, maintaining a low torque condition of the motor 62 so that the door stays closed requires providing a corresponding low d.c. current $I_A$ from the thyristor power supply 88 to the motor. For this condition of the power supply 88 and the motor 62, with reference to FIG. 3A, the switch 104 is open and both of the variable resistors 100 and 102 are effectively in circuit with the torque control regulator 96 This circuit condition of the resistors 100 and 102 results in a signal representative of a selected low current or a low torque level being produced to the torque regulator 96. The torque control regulator 96 compares the actual current signal from the current sensing device 94 and the selected reference low current signal resulting from the resistors 100 and 102 both being effectively in circuit with the regulator 96 and produces an output signal on line 106 to the power supply 88. The output signal from the regulator 96 will be in accord with the comparison of the selected low current level and the actual current level signal i.e., if the actual current signal is less or greater than the selected low current level signal, the output signal to the power supply 88 will control the power supply to respectively increase or decrease the level of the d.c. current $I_A$ to the motor until the low level selected current signal and the actual current signal are equal and maintain the d.c. current $I_A$ at the low level while the two signals remain equal. At the selected low level of current $I_A$, the motor torque will impose insufficient tension on the cable 68 so that tripping open of the dipper door will not occur. If it is desired that a high level of motor torque requiring a corresponding high level of d.c. current $I_A$ is required for tripping of the dipper door 38, the switch 104 may be closed to shunt the adjustable resistor 102 so that only adjustable resistor 100 is effectively in circuit with the regulator 96. This circuit condition results in a referenced signal representative of a selected high current level for a high torque of the motor 62 being compared with the actual current level signal from the sensing device 94. In accord with the comparison with the selected reference current level and the actual current signals by the regulator 96, an output from the regulator is provided on the line 106 to the power supply 88 which causes the power supply to change the level of the d.c. current $I_A$ in accord with the comparison made at the regulator 96, i.e., to increase or decrease the d.c. current $I_A$ until the selected high current level signal and the actual current level signal are equal and maintain the d.c. current $I_A$ at the high level while the two signals remain equal.

The thyristor power supply 88 has an operating condition in which its output voltage $V_A$, output current $I_A$, and the counter e.m.f. voltage $E_G$ of the motor 62 have the polarities or flow direction as shown in FIG. 3A when the motor direction has a cable take-in direction as shown by rotation arrow MR in FIG. 3A. As previously described, the current $I_A$ and therefore the level of the motor torque is held relatively fixed. The motor speed and therefore the voltage $E_G$ will be at levels permitted by the speed of the movement of the dipper toward the reel 64. A simplified equation for the circuit of the thyristor power supply 88 and motor 62 is $V_A = E_G + I_A R$ where R is the total resistance of the motor windings and connections. The thyristor power supply 88 is sized to produce a voltage $V_A$ permitting a motor speed as fast as permitted by the movement of the dipper so that a voltage $V_A$ will always be provided that satisfies the above equation. For example, if the motor speed and current $I_A$ are such that $E_G$ equals 100 volts and $I_A R$ equals 10 volts, voltage $V_A$ will be supplied at 110 volts.

Figure 3B:
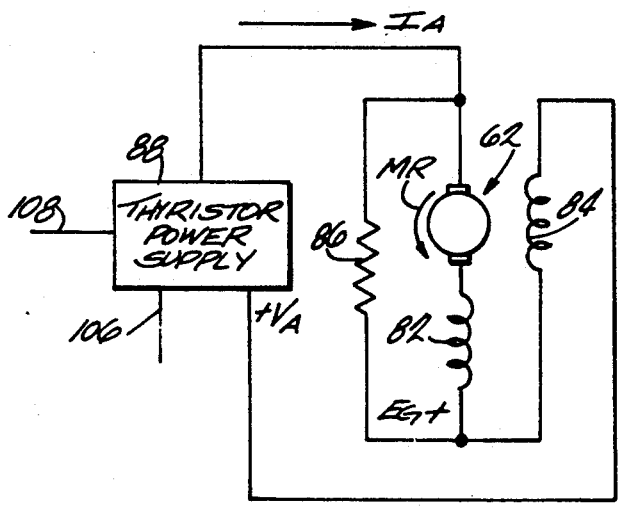
FIG. 3B is a schematic circuit diagram of a portion of the circuit illustrated in FIG. 3A for a different condition of the circuit.

When the motor is rotating in a cable pay-out direction and the motor 62 rotation is in the direction shown by arrow MR in FIG. 3B, the thyristor power supply 88 has an operating condition in which its output voltage $V_A$, output current $I_A$, and the voltage $E_G$ of the motor 62 have the polarities or flow direction as shown in FIG. 3B. The level of the current $I_A$ in both motor rotation directions shown in FIGS. 3A and 3B is substantially the same due to the same current level control by the regulator 96, therefore the level of the motor torque is substantially the same in both rotation directions. The motor speed and therefore the voltage $E_G$ will be at levels permitted by the speed of the movement of the dipper away from the rail 64 to pull the cable away from the reel and rotate the motor. Considering the circuit equation $V_A = E_G + I_A R$ in an example for the circuit of FIG. 3B, at the same current $I_A$ for both motor rotation directions, $I_A R$ would equal 10 volts and $E_G$ could equal 100 volts if the speed of the dipper away from the reel is the same as the speed of the dipper in the previous example when moving toward the reel. However, in the circuit condition of FIG. 3B, the voltage $E_G$ has a polarity in an opposite direction to that of the circuit in FIG. 3A. Therefore, the thyristor power supply will provide a voltage $V_A$ which, if the motor speed during cable pay-out is the same as that during cable take-in as in the example relating to FIG. 3A, will be $-100$ volts. The voltage $V_A$ that will be supplied by the thyristor power supply according to the circuit equation will then be $-90$ volts. Irrespective of the motor rotation direction, closing of the switch 104 can cause the regulator 96 to produce a output signal to the thyristor power supply 88 resulting in the power supply increasing the level of the current $I_A$ to the motor, to a sufficiently high level to increase the tension on the cable 68 to cause tripping of the dipper door. However, it is normally desired to accurately dump the material from the dipper at a single location and consequently the dipper movement is typically stopped or slowed very substantially before the current $I_A$ is increased to trip the dipper door. It may also be noted that the low level of the current $I_A$ is preferably such that the tension in the cable will not cause tripping of the dipper door but at the same time will be sufficient to avoid excessive cable slack which interferes with the operation of the shovel. If the d.c. current $I_A$ had previously been at a low level insufficient to cause the motor to trip open the dipper door, the increase of the current $I_A$ until the reference and actual signals are equal will cause the motor 62 to tension the cable 68 and remove the small amount of slack from the cable sufficiently to trip open the door.

The selected current level signals which are supplied by the regulator 96 to the power supply 88 may be modified by adjustment of the resistors 100 or 102. It should also be understood that additional selected current level reference signals beyond the two described above can be provided by the use of additional resistors and switches such as resistors 100, 102 and switch 104. With reference to the thyristor power supply 88, in this particular application it may be considered as a current source which produces a d.c. current level to the motor 62 in accord with the signal it receives from the regulator 96. The resistor 86 is a relatively small resistor, for example approximately 45 ohms, which provides a shunt path for current $I_A$ in the event of loss of motor load. The resistors 100, 102 and the switch 104 are also small control-type circuit elements which are relatively low in cost. There are no resistors or switches in the circuit of the motor and thyristor which need to be switched in or out of the circuit to control the speed of the motor and thus the high cost, high maintenance and poor efficiency and heat build-up problems as in prior art systems are eliminated.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. Dipper door trip apparatus for a surface mining shovel having a frame, a boom extending upward from the frame, a handle mounted on and movable relative to the boom, a dipper pivotally mounted on an end of the handle away from the boom and having a door pivotally affixed to the dipper, the dipper door being pivotally movable from a closed to an open position, the trip apparatus comprising;

a rotatable d.c. motor having a first torque producing condition and a second torque producing condition;

a d.c. power supply connected to the motor and including a selectively variable level current source having first and second current levels respectively corresponding to the first and second torque producing conditions of the motor; and dipper door trip means connected to the motor for tripping open the dipper door in response to a change in the power supply from its first to its second current level and a corresponding change in the motor from its first torque producing condition to its second torque producing condition.

2. The apparatus according to claim 1 further comprising:

connector means for electrically connecting the d.c. motor and the d.c. power supply, the connector means having connector resistance; and the connector resistance is the only resistance between the d.c. power supply and the d.c. motor.

3. The apparatus according to claim 1 further comprising:
   a motor circuit connected to the power supply, the d.c. motor comprising part of the motor circuit; and
   the motor circuit includes resistance having substantially the same value for both of said first and second current levels of the current source.

4. Dipper door trip apparatus for a surface mining shovel having a frame, a boom extending upward from the frame, a handle mounted on the boom for movement relative to the boom, a dipper pivotally mounted on an end of the handle away from the boom and having a door pivotally affixed to the dipper and connected to the trip apparatus, the dipper door being pivotally movable from a closed to an open position in response to the trip apparatus, comprising:
   a d.c. motor having a motor circuit including resistance in the circuit;
   a d.c. power supply connected to the motor;
   control means for selecting a plurality of different levels of current to the motor from the power supply independently of the resistance in the motor circuit;
   the motor having a plurality of torque levels each corresponding to one of the different current levels of the motor; and
   trip means connected to the motor and the dipper door and responsive to one of the torque levels of the motor for causing tripping open actuation of the trip apparatus.

5. The apparatus according to claim 4 wherein the d.c. power supply comprises a current source having said plurality of different levels of current to the motor.

* * * * *